US012786656B2

(12) United States Patent
Sato

(10) Patent No.: US 12,786,656 B2
(45) Date of Patent: Nov. 3, 2026

(54) IMAGE CAPTURE APPARATUS AND CONTROL METHOD

(71) Applicant: CANON KABUSHIKI KAISHA, Tokyo (JP)

(72) Inventor: Ryosuke Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 189 days.

(21) Appl. No.: 18/931,677

(22) Filed: Oct. 30, 2024

(65) Prior Publication Data

US 2025/0168581 A1 May 22, 2025

(30) Foreign Application Priority Data

Nov. 16, 2023 (JP) ................................ 2023-195292

(51) Int. Cl.
*H04S 7/00* (2006.01)
*G03B 29/00* (2021.01)

(52) U.S. Cl.
CPC .............. *H04S 7/301* (2013.01); *G03B 29/00* (2013.01); *H04R 2499/11* (2013.01)

(58) Field of Classification Search
CPC .. H04S 7/301; H04S 2400/15; H04S 2420/11; H04R 2499/11; H04R 5/027
See application file for complete search history.

(56) References Cited

U.S. PATENT DOCUMENTS

| | | | | |
|---|---|---|---|---|
| 11,418,694 | B2 * | 8/2022 | Kim | H04N 23/66 |
| 12,245,006 | B2 * | 3/2025 | Bian | H04N 21/4788 |
| 12,375,866 | B2 * | 7/2025 | Liu | G06F 3/165 |
| 2021/0152733 | A1 * | 5/2021 | Kasugai | H04N 23/611 |
| 2021/0227145 | A1 * | 7/2021 | Kasugai | H04N 23/675 |
| 2021/0349178 | A1 * | 11/2021 | Liu | H04S 7/303 |
| 2021/0400204 | A1 * | 12/2021 | Kasugai | G06F 3/167 |
| 2022/0150655 | A1 * | 5/2022 | Leppänen | H04S 7/30 |
| 2023/0073568 | A1 * | 3/2023 | Laaksonen | H04R 1/1041 |
| 2023/0088467 | A1 * | 3/2023 | Liu | H04S 7/303 700/94 |

FOREIGN PATENT DOCUMENTS

JP 2018152846 A 9/2018

* cited by examiner

*Primary Examiner* — David L Ton
(74) *Attorney, Agent, or Firm* — Cowan, Liebowitz & Latman, P.C.

(57) ABSTRACT

An image capture apparatus connects to a sound collection apparatus configured to collect sound data in different directions, generates stereophonic data based on sound data obtained from the sound collection apparatus, and corrects the stereophonic data based on a difference between a shooting direction of the image capture apparatus and a sound collecting direction of the sound collection apparatus.

16 Claims, 9 Drawing Sheets

IMAGE CAPTURE APPARATUS AND CONTROL METHOD

BACKGROUND OF THE INVENTION

Field of the Invention

The present invention relates to a technique of correcting stereophonic data.

Description of the Related Art

Stereophonic techniques such as Ambisonics have been known conventionally. Ambisonics is a technique that can collect sounds in all sound fields in a three-dimensional space throughout 360° using four microphone pieces of an Ambisonics microphone. This technique is often used as an acoustic technique for stereoscopic images. Ambisonics can convert sound signals in A-format collected by an Ambisonics microphone into 4-channel sound data in B-format and generate a sound signal having arbitrary directivity based on the sound data in B-format. Japanese Patent Laid-Open No. 2018-152846 discloses a method of generating stereophonic sound data by Ambisonics at the time of moving image shooting and correcting the stereophonic sound data based on the posture of the image capture apparatus at the time of moving image shooting.

Japanese Patent Laid-Open No. 2018-152846 is based on the assumption that an imaging unit and a sound collection unit are integrated, and the shooting direction and the sound collecting direction coincide with each other, and hence cannot correct the mismatch between the shooting direction and the sound collecting direction. This causes mismatch of directions between an image and a sound at the time of reproducing them, thus giving a feeling of strangeness to the user.

SUMMARY OF THE INVENTION

The present invention has been made in consideration of the aforementioned problems, and realizes techniques that can correct the mismatch between a shooting direction and a sound collecting direction so as to match the direction of a sound with an image.

In order to solve the aforementioned problems, the present invention provides an image capture apparatus comprising: at least one processor which functions as: a connection unit that connects to a sound collection apparatus configured to collect sound data in different directions; a sound processing unit that generates stereophonic data based on sound data obtained from the sound collection apparatus; and a correction unit that corrects the stereophonic data based on a difference between a shooting direction of the image capture apparatus and a sound collecting direction of the sound collection apparatus.

In order to solve the aforementioned problems, the present invention provides a method of controlling an image capture apparatus, comprising: connecting to a sound collection apparatus configured to collect sound data in different directions; generating stereophonic data based on the sound data obtained from the sound collection apparatus; and correcting the stereophonic data based on a difference between a shooting direction of the image capture apparatus and a sound collecting direction of the sound collection apparatus.

According to the present invention, it is possible to correct the mismatch between a shooting direction and a sound collecting direction so as to match the direction of a sound with an image.

Further features of the present invention will become apparent from the following description of exemplary embodiments (with reference to the attached drawings).

DESCRIPTION OF THE EMBODIMENTS

Figure 1:
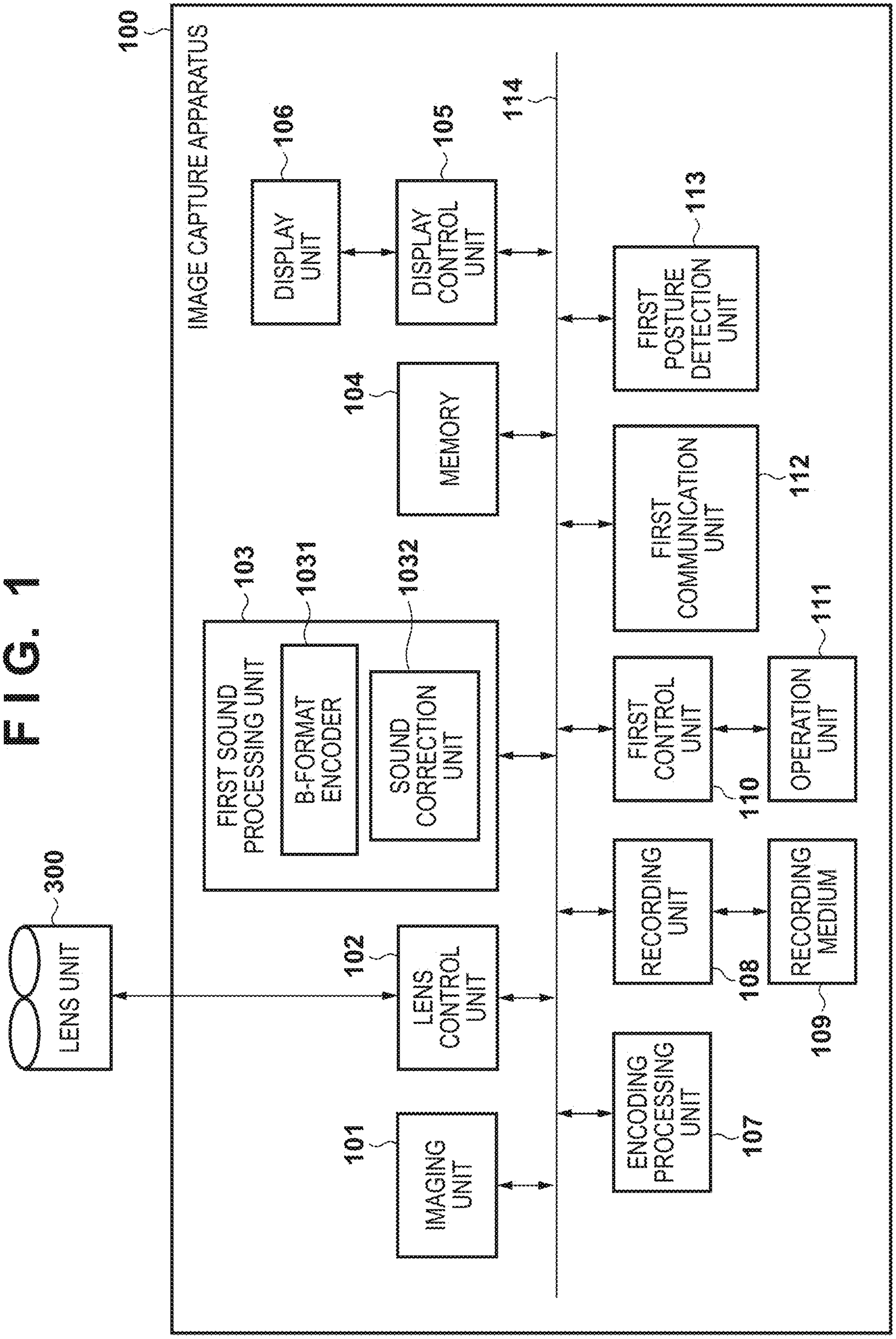
FIG. 1 is a block diagram exemplarily showing the configuration of an image capture apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing the configuration of an image capture apparatus 100 according to the first embodiment.

A lens unit 300 is detachable from the image capture apparatus 100. The lens unit 300 includes an optical lens and a driving mechanism that drives the optical lens. The lens unit 300 executes focusing, zooming, and camera shake correction during image capturing by driving the optical lens. Objects include moving objects and immobile objects. A plurality of types of lens units 300 are prepared to allow the user to selectively use a desired lens in accordance with the purpose. The lens unit 300 is a twin lens having two optical axes to enable the image capture apparatus 100 to capture stereoscopic images such as 180° moving images and 360° moving images. A stereoscopic image implements stereoscopic vision by using binocular parallax that is the positional shift of an image on the retinas of the left and right eyes of the human and making the human visual system recognize the depth of an image based on the positional shift of the image. The lens unit 300 can form an image capturing range (an angle of view) so as to cover up to all directions.

An imaging unit 101 includes an image sensor that converts an optical image of an object which is transmitted through the lens unit 300 into an analog image signal. The imaging unit 101 converts the analog image signal obtained by the image sensor into a digital signal and generates image data by executing various types of image processing. The image sensor is a photoelectric conversion element such as a CCD or a CMOS sensor.

A lens control unit 102 controls the lens unit 300 as needed based on the information obtained from the image data generated by the imaging unit 101 and the information obtained from a first control unit 110 (to be described later).

A first sound processing unit 103 receives, via a first communication unit 112, sound data from a sound collection apparatus 200 connected to the image capture apparatus 100. The first sound processing unit 103 includes a B-format encoder 1031 and a sound correction unit 1032 and executes first sound processing for the sound data received from the sound collection apparatus 200. The B-format encoder 1031 executes the processing of converting Ambisonics A-format sound data received from the sound collection apparatus 200 into B-format data. The sound correction unit 1032 executes the processing of correcting the B-format sound data based on the difference between the shooting direction of the image capture apparatus 100 (to be described later) and the sound collecting direction of the sound collection apparatus 200. The first sound processing will be described in detail later. This embodiment exemplifies a case where the image capture apparatus 100 and the sound collection apparatus 200 are connected to each other by a wireless communication scheme. However, limitation is not made thereto, and these apparatuses may be connected to each other by wire, for example, via an audio cable that can input/output stereophonic sounds.

A memory 104 temporarily stores the image data obtained by the imaging unit 101 and the sound data obtained by the first sound processing unit 103.

A display control unit 105 generates display data for displaying the image data obtained by the imaging unit 101, a GUI for the operation or setting of the image capture apparatus 100, and the like and outputs the display data to a display unit 106. The display unit 106 includes a display device such as a liquid crystal display or an organic EL display that displays the image or GUI based on the display data.

An encoding processing unit 107 generates compression-encoded image data or sound data by reading out the image data or sound data stored in the memory 104 and performing predetermined encoding processing. Note that sound data may not be encoded. Any compression encoding scheme for image data, such as MPEG2 or H.264/MPEG4-AVC, may be used. In addition, any compression encoding scheme for sound data, such as AC3AAC, ATRAC, or ADPCM, may be used.

A recording unit 108 controls the writing of data to a recording medium 109 and the reading of data from the recording medium 109. The recording unit 108 controls, with respect to the recording medium 109, the writing and reading of the image data and sound data compression-encoded by the encoding processing unit 107 or sound data that is not compression-encoded.

The recording medium 109 is an auxiliary storage device, such as a magnetic disk, an optical disk, or a semiconductor memory, which can record image data and sound data.

The first control unit 110 includes a processor such as a central processing unit (CPU) that performs arithmetic processing and control processing with respect to the image capture apparatus 100, a nonvolatile memory that stores the programs executed by the processor, data referred to by the programs, and the like, and a volatile memory in a which programs, reference data, and the like stored in the nonvolatile memory are loaded. The nonvolatile memory is an electrically erasable programmable read-only memory (EEROM) or flash memory. The volatile memory is a dynamic random access memory (DRAM). The nonvolatile memory and the volatile memory may be built-in memories that are built in the image capture apparatus 100 or external memories externally connected to the image capture apparatus 100. Note that programs according to this embodiment include programs for executing the flowcharts to be described later with reference to FIGS. 5A and 5B, FIGS. 7A and 7B, and FIGS. 9A and 9B.

An operation unit 111 includes operation members such as push buttons and a rotating dial that accept user operations and a touch panel integrally formed with the display unit 106. The operation unit 111 sends state information corresponding to the operation state of the operation unit 111 to the first control unit 110. The operation members included in the operation unit 111 include a power button for turning on/off the power of the image capture apparatus 100, a mode dial for setting an operation mode of the image capture apparatus 100, an image capture button for issuing an instruction to start or end the image capturing operation of the image capture apparatus 100, and a volume that adjusts the volume level of a sound to be reproduced. The operation mode of the image capture apparatus 100 can be switched to any one of the following modes: a still image shooting mode, a moving image shooting mode, and a reproduction mode for reproducing a still image, a moving image, and a sound.

The first communication unit 112 is connected to an external apparatus such as the sound collection apparatus 200 by a wireless communication scheme such as Wi-Fi® or Bluetooth® or a wired communication scheme such as USB so as to be able to communicate therewith and transmits/receives control information, sound data, and the like.

A first posture detection unit 113 detects a posture of the image capture apparatus 100 and sends posture information indicating the detected posture of the image capture apparatus 100 to the first control unit 110. The first control unit 110 detects the optical axis direction (shooting direction) of the image capture apparatus 100 based on the posture information obtained from the first posture detection unit 113. The first posture detection unit 113 includes an acceleration sensor, an angular velocity sensor, and a geomagnetic sensor.

A system bus 114 includes an address bus, a data bus, and a control bus that connect the components of the image capture apparatus 100 to each other such that data can be exchanged between them.

The basic operation of the image capture apparatus 100 according to this embodiment will be described here.

When the power button included in the operation unit 111 of the image capture apparatus 100 according to this embodiment is turned on, power is supplied from a power supply unit (not shown) to each component of the image capture apparatus 100 to enable each component of the image capture apparatus 100 to operate.

The first control unit 110 determines the operation mode of the image capture apparatus 100 based on state information corresponding to the operation state of the mode dial included in the operation unit 111.

In the moving image shooting mode, the first control unit 110 sends control information for transition to the shooting standby state to each component of the image capture apparatus 100. An operation in the shooting standby state is performed as follows.

The imaging unit 101 generates image data by capturing, with the image sensor, an optical image of an object captured by the lens unit 300. The image data generated by the imaging unit 101 is sent to the display control unit 105. The display control unit 105 generates display data based on the image data and displays a live view image on the display unit 106. The user prepares for shooting while watching the image displayed on the display unit 106.

In the shooting standby state, when the user operates the shooting button included in the operation unit 111, a recording start instruction is notified to the first control unit 110. Upon receiving the recording start instruction, the first control unit 110 sends control information for transition to the moving image shooting mode to each component of the image capture apparatus 100. When recording is started, the first control unit 110 stores the moving image data obtained by the imaging unit 101 and the sound data obtained by the first sound processing unit 103 as one file. In the moving image shooting mode, the image capture apparatus 100 performs a recording operation as follows.

The imaging unit 101 generates image data by capturing, with the image sensor, an optical image of an object captured by the lens unit 300. The image data generated by the imaging unit 101 is sent to the display control unit 105 and stored in the memory 104. The display control unit 105 generates display data based on the image data and displays the data on the display unit 106.

The first sound processing unit 103 executes first sound processing for the sound data received from the sound collection apparatus 200 via the first communication unit 112. The first sound processing unit 103 generates multi-channel sound data by executing the first sound processing for a plurality of sound data obtained by a plurality of microphone pieces of the sound collection apparatus 200. The generated sound data is stored in the memory 104.

The encoding processing unit 107 generates compression-encoded image data and sound data by reading out the image data and sound data stored in the memory 104 and performing predetermined encoding processing.

The first control unit 110 forms a data stream by combining the image data and the sound data compression-encoded by the encoding processing unit 107 and sends the data stream to the recording unit 108. When the sound data is not compression-encoded, the first control unit 110 forms a data stream by combining the sound data stored in the memory 104 and the compression-encoded image data and sends the data stream to the recording unit 108.

The recording unit 108 writes a data stream as one moving image file in the recording medium 109 so as to allow the file to be managed in accordance with a file system such as a universal disk format (UDF) or file allocation tables (FAT).

The above operation is continued during a recording operation.

When the user operates the shooting button included in the operation unit 111 during a recording operation, a recording stop instruction is notified to the first control unit 110. Upon receiving the recording stop instruction, the first control unit 110 sends control information for transition to the shooting standby state to each component of the image capture apparatus 100.

The first control unit 110 causes the imaging unit 101 to stop generating image data and performing the sound processing for the sound data obtained by the first sound processing unit 103.

The encoding processing unit 107 performs predetermined encoding processing upon reading out the remaining image data and sound data stored in the memory 104 and stops recording upon generating compression-encoded image data or compression-encoded sound data. When the sound data is not compression-encoded, the recording operation is also stopped at the time of the end of the generation of compression-encoded image data.

The first control unit 110 forms a data stream by combining the image data compression-encoded by the encoding processing unit 107 and compression-encoded sound data or sound data that is not compression-encoded and outputs the data stream to the recording unit 108. The first control unit 110 then stops the recording operation upon causing the recording unit 108 to write the data stream as one moving image file in the recording medium 109.

When the first control unit 110 stops the recording operation, each component of the image capture apparatus 100 returns to the shooting standby state.

The moving image file generated by the image capture apparatus 100 can be reproduced as a stereoscopic image by a reproduction device such as a head mounted display. In addition, the image to be reproduced is combined with a sound, and the sound is output in accordance with the direction of the head portion of the user wearing the head mounted display as a reproduction device, thereby providing the image with the sound and realistic sensations.

The above description is about the configuration of the image capture apparatus 100 and the basic operation at the time of recording.

The recording operation of the image capture apparatus 100 and the sound collecting operation of the sound collection apparatus 200 according to the first embodiment will be described next with reference to FIGS. 2 to 5B.

Figure 2:
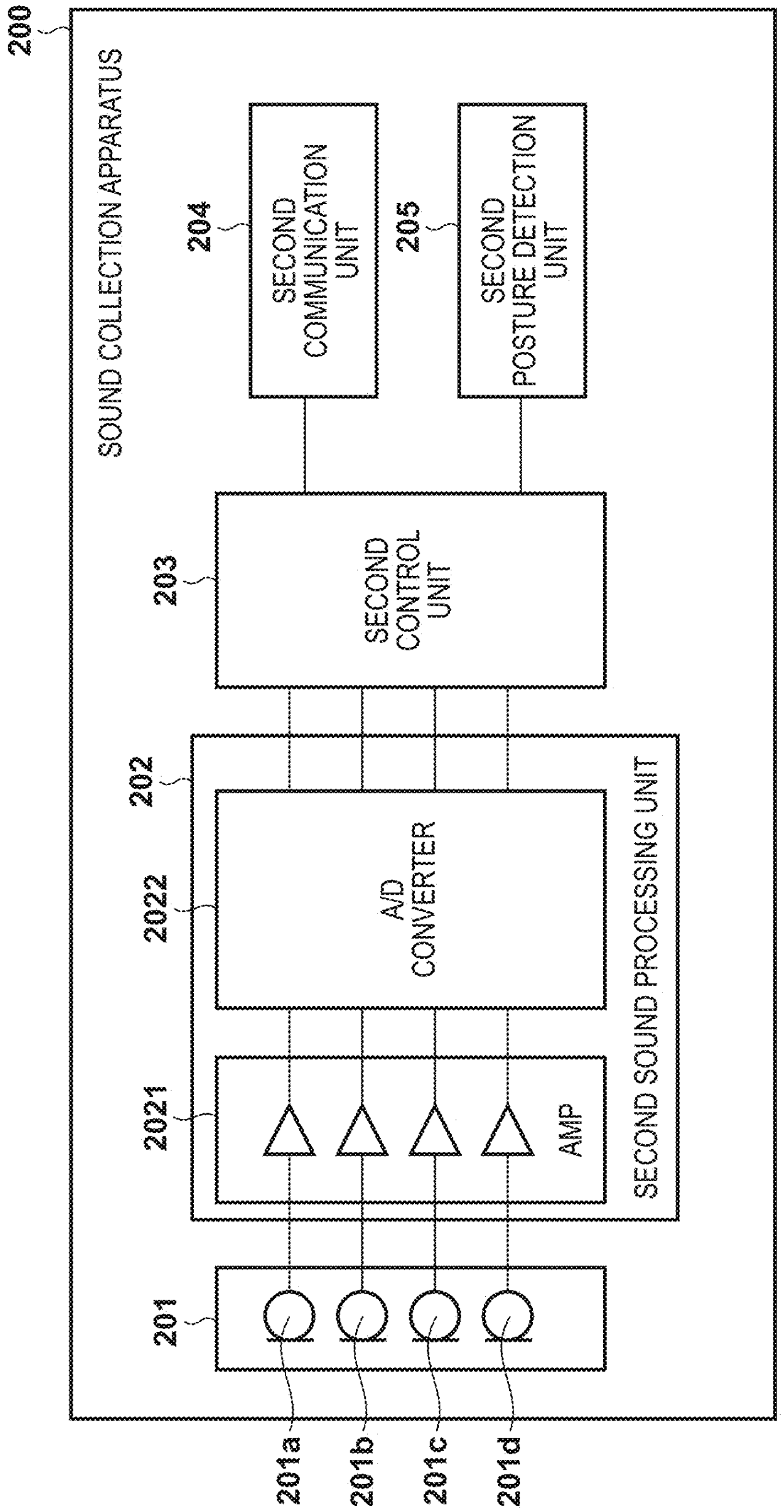
FIG. 2 is a block diagram exemplarily showing the configuration of a sound collection apparatus according to the first embodiment.

FIG. 2 is a block diagram exemplarily showing the configuration of the sound collection apparatus 200 according to the first embodiment.

A microphone unit 201 includes a plurality of microphone pieces. In this embodiment, the microphone unit 201 includes four microphone pieces, namely a first microphone piece 201*a*, a second microphone piece 201*b*, a third microphone piece 201*c*, and a fourth microphone piece 201*d*. In the embodiment, stereophonic data (3D audio data) can be generated by an Ambisonics scheme from the sound data simultaneously obtained from the first microphone piece 201*a*, the second microphone piece 201*b*, the third microphone piece 201*c*, and the fourth microphone piece 201*d* in the microphone unit 201. The Ambisonics scheme converts A-format sound data collected by the four unidirectional microphone pieces into 4-channel B-format sound data containing an omnidirectional component (W component) and bidirectional components (X, Y, and Z components) with front-and-rear directivity, left-and-right directivity, and up-and-down directivity. It is then possible to generate multi-channel (exceeding four channels) sound data with arbitrary directivity from the B-format sound data using spherical surface harmonics.

Figure 3A:
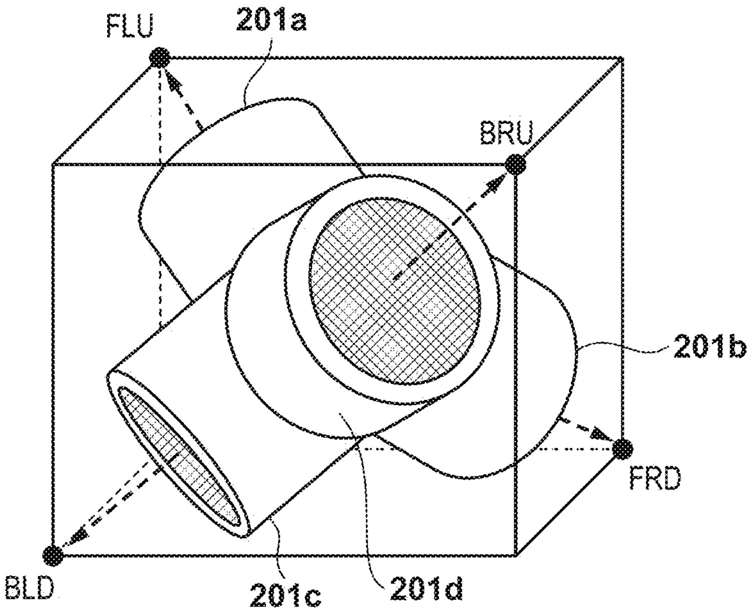
FIGS. 3A and 3B are schematic views of a sound collection unit according to the first embodiment.
Figure 3B:
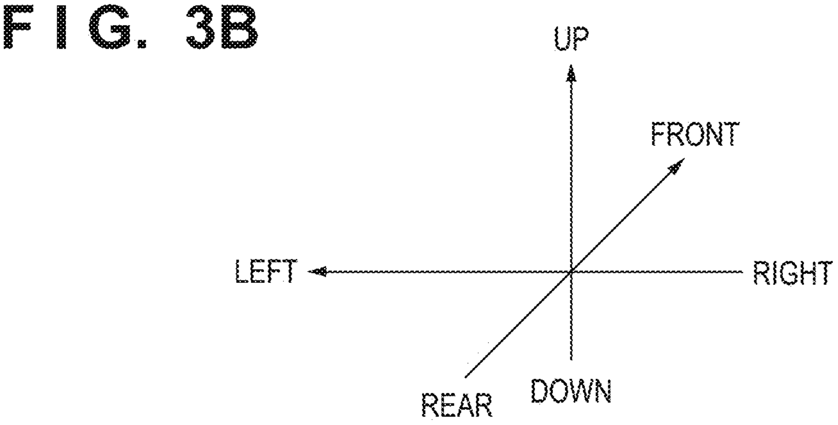

FIG. 3A exemplarily shows the external configuration of the microphone unit 201. As shown in FIG. 3A, the four microphone pieces 201*a* to 201*d* of the microphone unit 201 are provided so as to be directed to the four vertices of a cube. The three-dimensional space in FIG. 3A is defined by the respective directions in FIG. 3B, namely FRONT, REAR, LEFT, RIGHT, UP, and DOWN. In this case, the first microphone piece 201*a* is directed to the front upper left (FLU) side, the second microphone piece 201*b* is directed to the front lower right (FRD) side, the third microphone piece 201*c* is directed to the rear lower left (BLD) side, and the fourth microphone piece 201*d* is directed to the rear upper right (BRU) side. The four microphone pieces 201*a* to 201*d* are microphones having single directivity, and hence sound signals in the four directions in which respective microphone pieces are directed can be obtained. The 4-direction sound signal is referred to as Ambisonics A-format.

A second sound processing unit 202 executes various types of signal processing for the analog sound signal obtained by the microphone unit 201. The second sound processing unit 202 causes a signal amplification unit 2021 to amplify the analog sound signal and causes an A/D converter 2022 to convert the signal into a digital sound signal.

A second control unit 203 includes a processor such as a CPU that performs arithmetic processing and control processing with respect to the sound collection apparatus 200, a nonvolatile memory that stores programs executed by the processor, data referred to by the programs, and the like, and a volatile memory in a which programs, reference data, and the like stored in the nonvolatile memory are loaded. The nonvolatile memory is an EEROM or flash memory. The volatile memory is a DRAM. The nonvolatile memory and the volatile memory may be built-in memories that are built in the sound collection apparatus 200 or external memories externally connected to the sound collection apparatus 200. Note that programs according to this embodiment include programs for executing the flowcharts to be described later with reference to FIGS. 5A and 5B, FIGS. 7A and 7B, and FIGS. 9A and 9B.

The second communication unit 204 is connected to an external apparatus such as the image capture apparatus 100 by a wireless communication scheme such as Wi-Fi® or Bluetooth® or a wired communication scheme such as USB so as to be able to communicate therewith and transmits/receives control information, sound data, and the like.

A second posture detection unit 205 detects a posture of the sound collection apparatus 200 and sends an information indicating the detected posture of the sound collection apparatus 200 to the second control unit 203. The second control unit 203 detects the direction (sound collecting direction) of the sound collection apparatus 200 based on the posture information obtained from the second posture detection unit 205. The second posture detection unit 205 includes an acceleration sensor, an angular velocity sensor, and a geomagnetic sensor.

Figure 4:
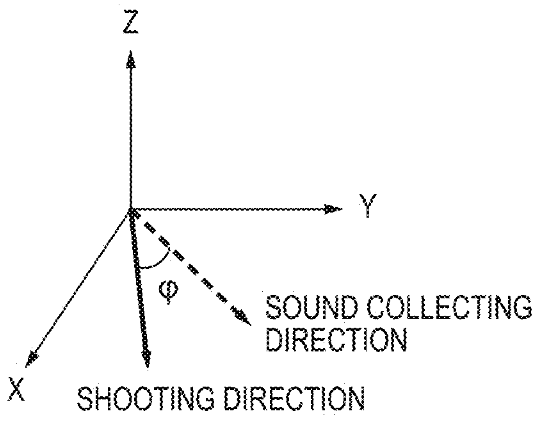
FIG. 4 is a view illustrating the relationship between the shooting direction and the sound collecting direction according to the first embodiment.

The relationship between the shooting direction of the image capture apparatus 100 and the sound collecting direction of the sound collection apparatus 200 according to the first embodiment will be described next with reference to FIG. 4.

The image capture apparatus 100 and the sound collection apparatus 200 can be operated and moved independently of each other. In this embodiment, for example, assume that the user performs image recording and sound recording while walking, carrying the image capture apparatus 100 with one hand and carrying the sound collection apparatus 200 with the other hand. The image capture apparatus 100 and the sound collection apparatus 200 are connected to each other by a wireless communication scheme and can communicate control information and the like with each other. In addition, the image capture apparatus 100 can receive sound data from the sound collection apparatus 200. The shooting direction of the image capture apparatus 100 corresponds to the front direction of the lens unit 300 of the image capture apparatus 100. The sound collecting direction of the sound collection apparatus 200 corresponds to the front direction of the microphone unit 201 of the sound collection apparatus 200 and the FRONT direction shown in FIG. 3B. In addition, since the image capture apparatus 100 and the sound collection apparatus 200 can be operated and moved independently of each other, the shooting direction and the sound collecting direction may not be the same direction ($\phi=0$) as shown in FIG. 4 depending on the states of the image capture apparatus 100 and the sound collection apparatus 200 at the time of recording.

Control processing by the image capture apparatus 100 and the sound collection apparatus 200 according to the first embodiment will be described next with reference to FIGS. 5A and 5B.

Figure 5A:
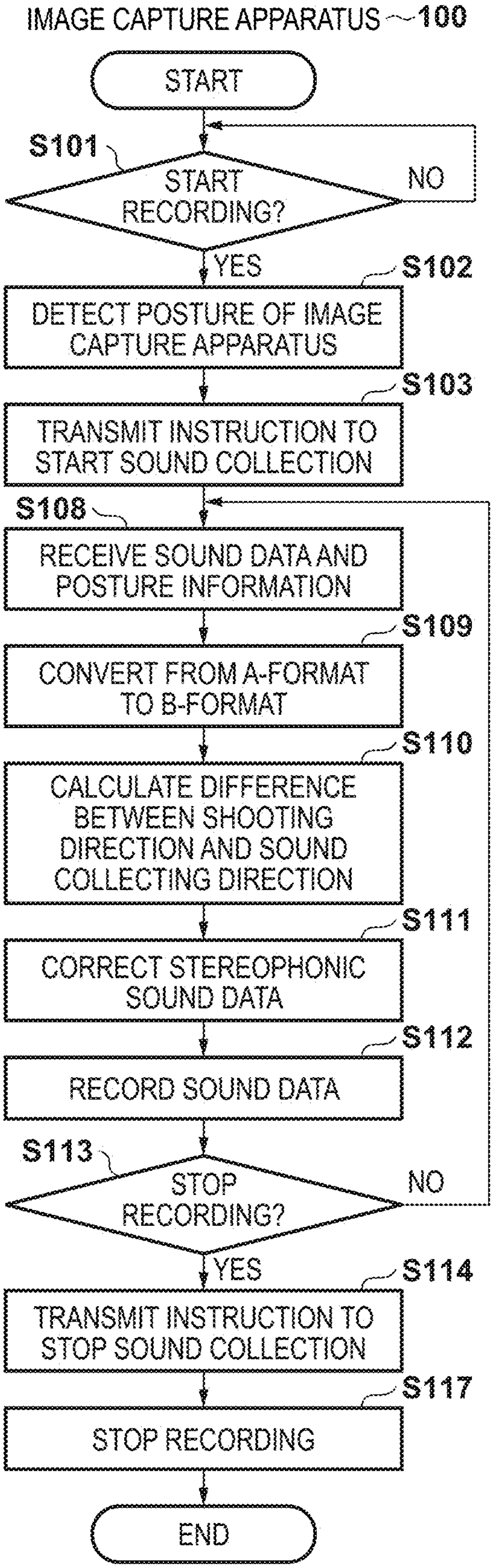
FIGS. 5A and 5B are flowcharts exemplarily showing control processing according to the first embodiment.
Figure 5B:
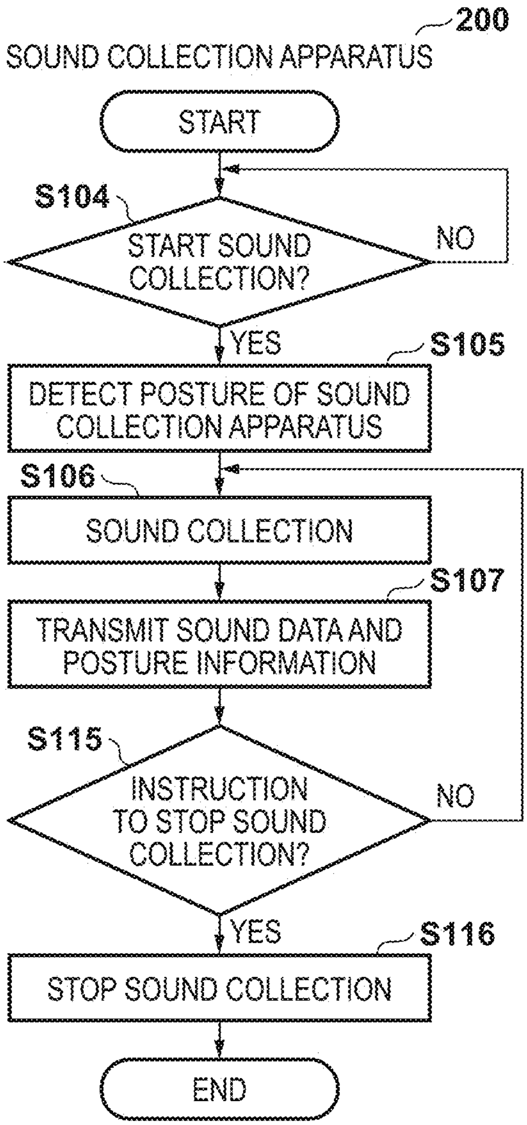

FIG. 5A is a flowchart exemplarily showing control processing by the image capture apparatus 100 according to the first embodiment. FIG. 5B is a flowchart exemplarily showing control processing by the sound collection apparatus 200 according to the first embodiment.

The processing in FIG. 5A is implemented by the first control unit 110 loading a program stored in the nonvolatile memory into the volatile memory and executing the program. In addition, the processing in FIG. 5B is implemented by the second control unit 203 loading a program stored in the nonvolatile memory into the volatile memory and executing the program. The same applies to the processing in FIGS. 7A and 9A. The processing in FIGS. 5A and 5B is started while the image capture apparatus 100 is connected to the sound collection apparatus 200 so as to be able to communicate therewith. Although sound recording processing in the recording operation of the image capture apparatus 100 will be described with reference to FIG. 5A, assume that image recording processing is simultaneously executed. The same applies to the processing in FIGS. 7A and 9A described later.

In step S101, the first control unit 110 starts sound recording processing in response to the notification of a recording start instruction from the operation unit 111.

In step S102, the first control unit 110 causes the first posture detection unit 113 to start detecting the posture of the image capture apparatus 100. Performing the posture detection with, for example, a 3-axis geomagnetic sensor will obtain, for example, information indicating that the shooting direction of the image capture apparatus 100 is directed to the north as the posture information of the image capture apparatus 100 with respect to azimuth.

In step S103, the first control unit 110 causes the first communication unit 112 to transmit a sound collecting operation start instruction to the sound collection apparatus 200.

In step S104, the second control unit 203 waits until receiving the sound collecting operation start instruction from the image capture apparatus 100 and proceeds the process to step S105 upon receiving the sound collecting operation start instruction.

In step S105, the second control unit 203 causes the second posture detection unit 205 to start detecting the posture of the sound collection apparatus 200. Performing the posture detection with, for example, a 3-axis geomagnetic sensor will obtain, for example, information indicating that the sound collecting direction of the sound collection apparatus 200 is directed to the north as the posture information of the sound collection apparatus 200 with respect to azimuth.

In step S106, the second control unit 203 causes the sound collection apparatus 200 to start a sound collecting operation. The sound collection apparatus 200 obtains a sound at arbitrary predetermined intervals and executes second sound processing. The sound collection apparatus 200 continues the sound collecting operation until receiving a sound collecting operation stop instruction from the image capture apparatus 100.

In step S107, the second control unit 203 causes the second communication unit 204 to transmit the posture information of the sound collection apparatus 200 obtained in step S105 and Ambisonics A-format data as the sound data obtained in step S106 to the image capture apparatus 100. Assume that the posture information includes time information synchronized with the time at which the sound has been collected.

In step S108, the first control unit 110 causes the first communication unit 112 to receive the sound data obtained by the sound collection apparatus 200 from the sound collection apparatus 200 and the posture information of the sound collection apparatus 200.

In step S109, the first control unit 110 converts the Ambisonics A-format sound data received in step S108 into B-format. B-format is sound data containing an omnidirectional component and a bidirectional component according to an acoustic technique based on the Ambisonics scheme. B-format is a data format including a omnidirectional signal W in all directions, a front-and-rear directional signal X, a left-and-right directional signal Y, and an up-and-down directional signal Z. Conversion from A-format to B-format is performed according to equations (1) given below.

$$\begin{aligned} W &= FLU + FRD + BLD + BRU \\ X &= FLU + FRD - BLD - BRU \\ Y &= FLU - FRD + BLD - BRU \\ Z &= FLU - FRD - BLD + BRU \end{aligned} \quad \text{(Equations 1)}$$

W: omnidirectional signal (B-format)

X: bidirectional signal with front-and-rear directivity (B-format)

Y: bidirectional signal with left-and-right directivity (B-format)

Z: bidirectional signal with up-and-down directivity (B-format)

FLU: front upper left sound signal (A-format) obtained by first microphone piece FRD: front lower right sound signal (A-format) obtained by second microphone piece BLD: rear lower left sound signal (A-format) obtained by third microphone piece BRU: rear upper right sound signal (A-format) obtained by fourth microphone piece In step S110, the first control unit 110 calculates the difference between the posture of the image capture apparatus 100 and the posture of the sound collection apparatus 200 in a period in which the sound has collected based on the posture information of the image capture apparatus 100 obtained by the first posture detection unit 113 and the posture information of the sound collection apparatus 200 received in step S108. The first control unit 110 then calculates the difference between the shooting direction of the image capture apparatus 100 and the sound collecting direction of the sound collection apparatus 200 based on the difference between the posture of the image capture apparatus 100 and the posture of the sound collection apparatus 200. In this embodiment, the first posture detection unit 113 and the second posture detection unit 205 perform posture detection using 3-axis geomagnetic sensors, and hence the shooting direction of the image capture apparatus 100 can be relatively compared with the sound collecting direction of the sound collection apparatus 200 in the same coordinate system. In the case in FIG. 4, when the X direction is north, the first posture detection unit 113 detects a shooting direction, and the second posture detection unit 205 detects a sound collecting direction. It is possible to calculate a difference $\phi$ between the shooting direction and the sound collecting direction based on the information obtained from these posture detection units. The case in FIG. 4 exemplarily shows that there is the difference $\phi$ between the shooting direction and the sound collecting direction on an X-Y plane.

In step S111, the first control unit 110 causes the sound correction unit 1032 of the first sound processing unit 103 to correct the B-format sound data generated in step S109 based on the difference $\phi$ between the shooting direction and the sound collecting direction calculated in step S110.

The sound data is corrected by coordinate transformation on the X-Y plane according to equation (2) given below.

$$\begin{bmatrix} W' \\ X' \\ Y' \\ Z' \end{bmatrix} = \begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix} \begin{bmatrix} W \\ X \\ Y \\ Z \end{bmatrix} \quad (2)$$

Equation (3) is a correction formula on the X-Y plane. Likewise, correction on an X-Z plane is performed according to equation (3), and correction on a Y-Z plane is performed according to equation (4).

$$\begin{bmatrix} W' \\ X' \\ Y' \\ Z' \end{bmatrix} = \begin{bmatrix} 1 & 0 & 0 & 0 \\ 0 & \cos\phi & 0 & \sin\phi \\ 0 & 0 & 1 & 0 \\ 0 & -\sin\phi & 0 & \cos\phi \end{bmatrix} \begin{bmatrix} W \\ X \\ Y \\ Z \end{bmatrix} \quad (3)$$

$$\begin{bmatrix} W' \\ X' \\ Y' \\ Z' \end{bmatrix} = \begin{bmatrix} 1 & 0 & 0 & 0 \\ 0 & 1 & 0 & 0 \\ 0 & 0 & \cos\phi & -\sin\phi \\ 0 & 0 & \sin\phi & \cos\phi \end{bmatrix} \begin{bmatrix} W \\ X \\ Y \\ Z \end{bmatrix} \quad (4)$$

In step S112, the first control unit 110 generates a data stream by combining the B-format sound data corrected in step S111 and the moving image data generated by recording processing executed at the same time and records the data stream in the recording medium 109.

Note that the processing from step S101 to step S111 is executed before the start of recording.

In step S113, the first control unit 110 determines whether it has received a recording stop instruction from the operation unit 111. When a recording operation stop instruction is received from the operation unit 111, the first control unit 110 proceeds the process to step S114. When a recording operation stop instruction is not received from the operation unit 111, the first control unit 110 returns the process to step S108 to continue the recording.

In step S114, the first control unit 110 causes the first communication unit 112 to transmit an instruction to stop the sound collecting operation to the sound collection apparatus 200.

In step S115, the second control unit 203 determines whether it has received the instruction to stop the sound collecting operation from the image capture apparatus 100. When the instruction to stop the sound collecting operation is received from the image capture apparatus 100, the second control unit 203 proceeds the process to step S116. When the instruction to stop the sound collecting operation is not received from the image capture apparatus 100, the second control unit 203 returns the process to step S106 to continue the sound collecting operation.

In step S116, the second control unit 203 stops the sound collecting operation. The second control unit 203 sends control information for stopping the sound collecting operation to each component of the sound collection apparatus 200.

In step S117, the first control unit 110 executes recording stop processing. The first control unit 110 transmits control information for stopping the recording operation to each component of the image capture apparatus 100.

According to the first embodiment, in a case where the shooting direction of the image capture apparatus 100 does not coincide with the sound collecting direction of the sound collection apparatus 200, the sound data obtained by the sound collection apparatus 200 is corrected based on the difference between the shooting direction and the sound collecting direction so as to make the shooting direction coincide with the sound collecting direction. Note that although the sound data is preferably corrected so as to make the shooting direction coincide with the sound collecting direction, limitation is not made thereto. The correction may be performed so as to reduce the difference between the shooting direction and the sound collecting direction to a predetermined value or less and bring the shooting direction close to the sound collecting direction. This makes it possible to correct the mismatch between the shooting direction and the sound collecting direction and match the sound direction with the moving image, thereby reducing the feeling of strangeness of the user caused by the mismatch between the moving image and the sound at the time of reproducing the moving image.

Second Embodiment

The second embodiment will be described next with reference to FIGS. 6A, 6B, 7A, and 7B.

The configurations and basic operations of an image capture apparatus 100 and a sound collection apparatus 200 according to the second embodiment are the same as those of the first embodiment.

Figure 6A:
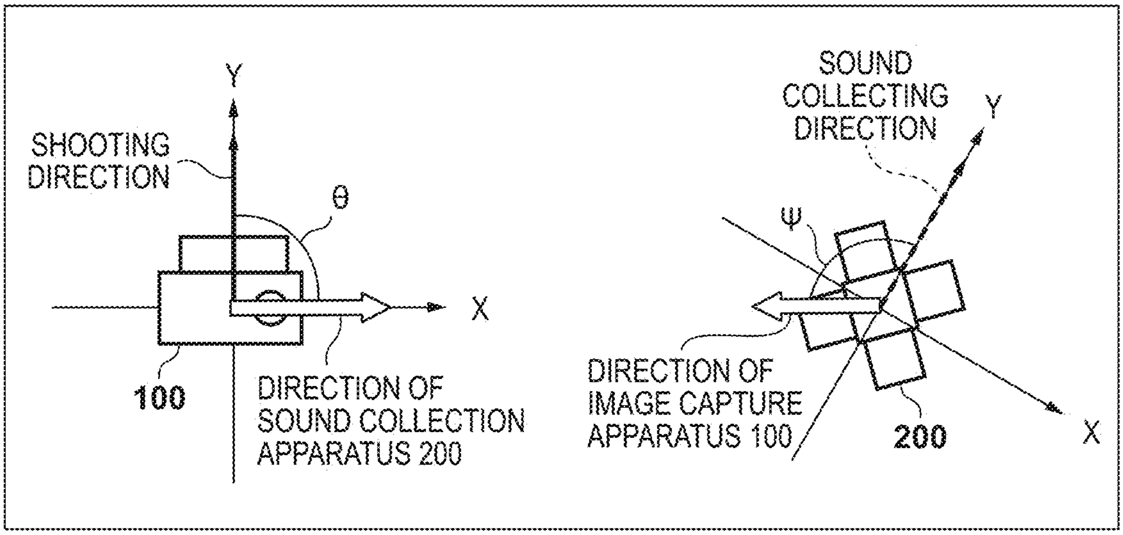
FIGS. 6A and 6B are views illustrating the relationship between the shooting direction and the sound collecting direction according to a second embodiment.
Figure 6B:
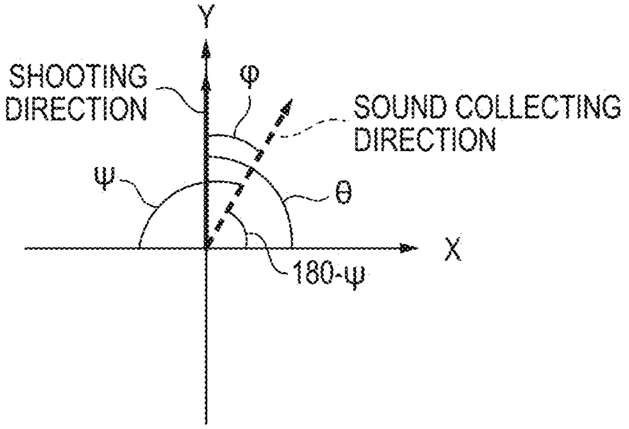

FIGS. 6A and 6B are views illustrating the relationship between the shooting direction of the image capture apparatus 100 and the sound collecting direction of the sound collection apparatus 200 according to the second embodiment.

In the second embodiment, a first communication unit 112 of the image capture apparatus 100 and a second communication unit 204 of the sound collection apparatus 200 each can detect, by wireless communication, the direction in which the other apparatus is located with respect to the position of itself. Direction detection is implemented by, for example, a direction detection function complying with Bluetooth 5.1®. However, limitation is not made thereto, and direction detection may be implemented by another method.

Figure 7A:
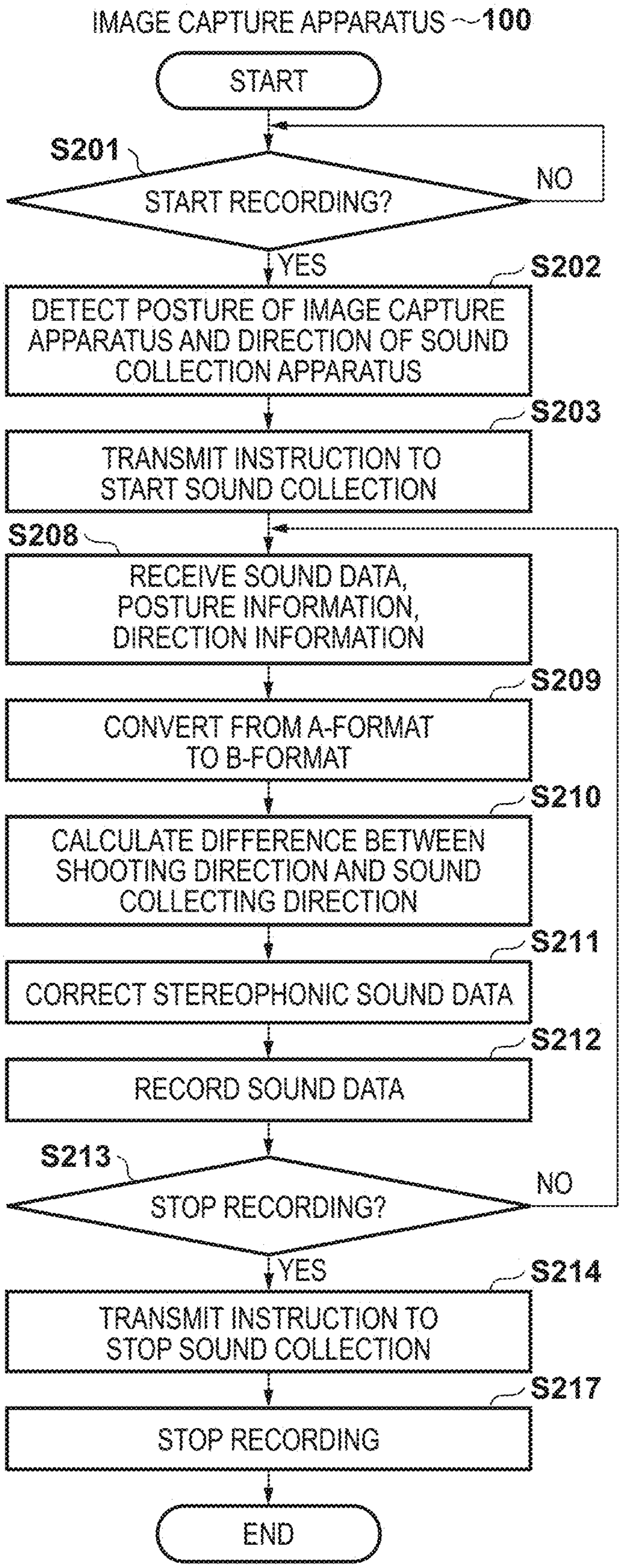
FIGS. 7A and 7B are flowcharts exemplarily showing control processing according to the second embodiment.
Figure 7B:
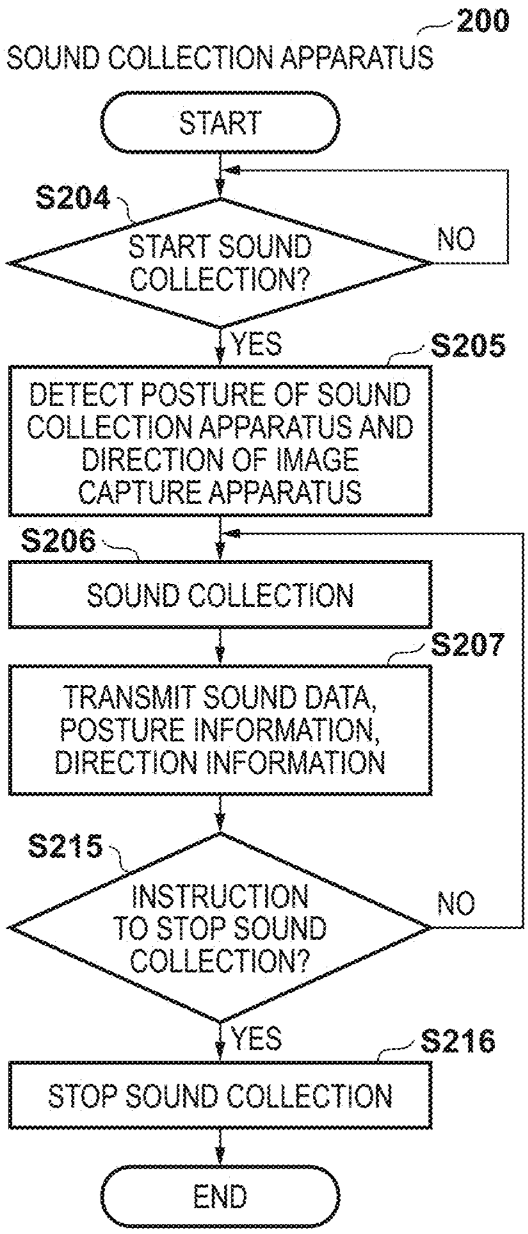

FIG. 7A is a flowchart exemplarily showing control processing by the image capture apparatus 100 according to the second embodiment. FIG. 7B is a flowchart exemplarily showing control processing by the sound collection apparatus 200 according to the second embodiment.

Step S201 is the same processing as that in step S101 in FIG. 5A.

In step S202, a first control unit 110 causes a first posture detection unit 113 to detect the posture of the image capture apparatus 100. The first control unit 110 also causes the direction detection function of a first communication unit 112 to detect the direction in which the sound collection apparatus 200 is located with respect to the position of the image capture apparatus 100. Subsequently, the first control unit 110 repeatedly executes the detection of the posture of the image capture apparatus 100 using the first posture detection unit 113 and the detection of the direction in which the sound collection apparatus 200 is located using the direction detection function of the first communication unit 112. The posture of the image capture apparatus 100 is detected by, for example, a 3-axis acceleration sensor. Since the mounted state of the first communication unit 112 in the image capture apparatus 100 is known, an angle θ defined by the direction in which the sound collection apparatus 200 is located with respect to the position of the image capture apparatus 100 and the shooting direction of the image capture apparatus 100 is uniquely determined, as shown in FIG. 6A.

Steps S203 and S204 are the same processing as that in steps S103 and S104 in FIG. 5A.

In step S205, a second control unit 203 causes a second posture detection unit 205 to detect the posture of the sound collection apparatus 200. The second control unit 203 also causes the direction detection function of a second communication unit 204 to detect the direction in which the image capture apparatus 100 is located with respect to the position of the sound collection apparatus 200. Subsequently, the second control unit 203 repeatedly executes the detection of the posture of the sound collection apparatus 200 using the second posture detection unit 205 and the detection of the direction in which the image capture apparatus 100 is located using the direction detection function of the second communication unit 204. The posture of the sound collection apparatus 200 is detected by, for example, a 3-axis acceleration sensor. Since the mounted state of the second communication unit 204 in the sound collection apparatus 200 is known, an angle φ defined by the direction in which the image capture apparatus 100 is located with respect to the position of the sound collection apparatus 200 and the sound collecting direction of the sound collection apparatus 200 is uniquely determined, as shown in FIG. 6A.

Step S206 is the same processing as that in step S106 in FIG. 5A.

In step S207, the second control unit 203 causes the second communication unit 204 to transmit, to the image capture apparatus 100, the direction information of the image capture apparatus 100 with respect to the sound collection apparatus 200, obtained in step S205, the sound collecting direction of the sound collection apparatus 200, and the A-format sound data obtained in step S206. The direction information of the image capture apparatus 100 and the sound collecting direction information of the sound collection apparatus 200 include time information synchronized with the time at which the sound has been collected.

In step S208, the first control unit 110 causes the first communication unit 112 to receive, from the sound collection apparatus 200, the direction information of the image capture apparatus 100 with respect to the sound collection apparatus 200, the posture information of the sound collection apparatus 200, and the A-format sound data.

Step S209 is the same processing as that in step S109 in FIG. 5A.

In step S210, the first control unit 110 calculates the difference ϕ between the shooting direction of the image capture apparatus 100 and the sound collecting direction of the sound collection apparatus 200.

A method of calculating the difference θ between the shooting direction and the sound collecting direction will be described here with reference to FIG. 6B.

As shown in FIG. 6B, the difference ϕ between the shooting direction and the sound collecting direction is calculated according to equation (5) given below.

$$\phi = \theta - (180 - \varphi) = \theta + \varphi - 180 \tag{5}$$

In step S211, the first control unit 110 causes a sound correction unit 1032 of a first sound processing unit 103 to correct the B-format sound data converted in step S209 based on the difference ϕ between the shooting direction and the sound collecting direction calculated in step S210. The correction method is the same as that described with reference to step S111 in FIG. 5A.

Steps S212 to S217 are the same processing as that in steps S112 to S117 in FIG. 5A. In addition, the processing in steps S201 to S211 is executed before the start of recording.

According to the second embodiment described above, the image capture apparatus 100 and the sound collection apparatus 200 each can detect the direction in which the other apparatus is located with respect to the position of itself by wireless communication. The difference between the shooting direction of the image capture apparatus 100 and the sound collecting direction of the sound collection apparatus 200 is calculated from the direction information of the sound collection apparatus 200 with respect to the image capture apparatus 100 and the direction information of the image capture apparatus 100 with respect to the sound collection apparatus 200. In a case where the shooting direction of the image capture apparatus 100 does not coincide with the sound collecting direction of the sound collection apparatus 200, the sound data obtained by the sound collection apparatus 200 is corrected based on the difference between the shooting direction and the sound collecting direction so as to match the shooting direction with the sound collecting direction. Note that although the sound data is preferably corrected so as to match the shooting direction with the sound collecting direction, limitation is not made thereto. The correction may be performed so as to reduce the difference between the shooting direction and the sound collecting direction to a predetermined threshold or less and bring the shooting direction close to the sound collecting direction. This makes it possible to correct the mismatch between the shooting direction and the sound collecting direction and match the sound direction with the moving image, thereby reducing the feeling of strangeness of the user caused by the mismatch between the moving image and the sound at the time of reproducing the moving image.

According to the first and second embodiments described above, the image capture apparatus 100 executes the processing of converting the A-format sound data obtained by the sound collection apparatus 200 into B-format and the processing of correcting the B-format sound data. However, the sound collection apparatus 200 may execute conversion processing and correction processing for sound data and transmit the data after the processing to the image capture apparatus 100.

Third Embodiment

The third embodiment will be described next with reference to FIGS. 8A, 8B, 9A, and 9B.

Note that the configurations and basic operations of an image capture apparatus 100 and a sound collection apparatus 200 according to the third embodiment are the same as those of the first embodiment shown in FIGS. 1 and 2.

Figure 8A:
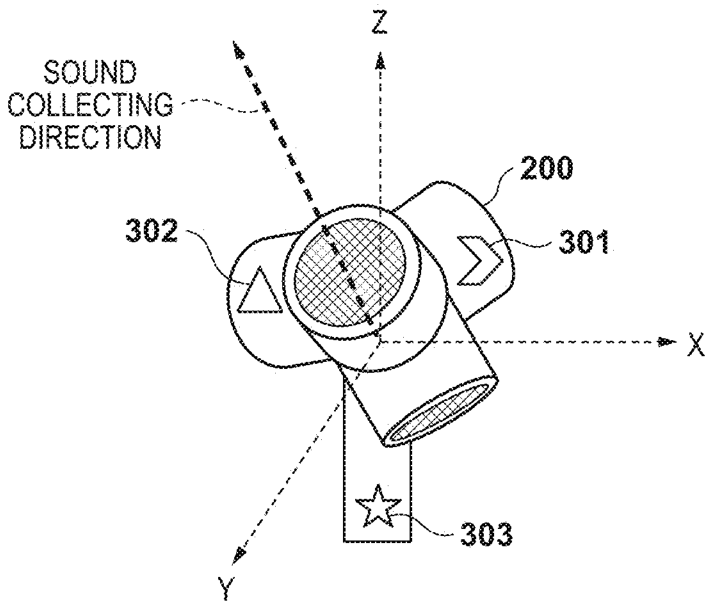
FIGS. 8A and 8B are views illustrating the relationship between the shooting direction and the sound collecting direction according to the third embodiment.
Figure 8B:
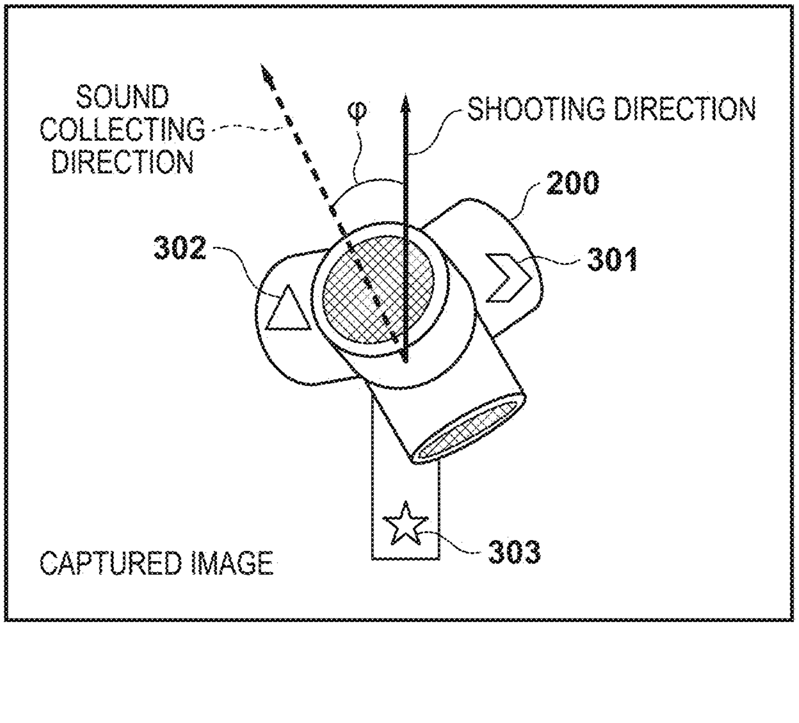

FIGS. 8A and 8B exemplarily show the external appearance and configuration of the sound collection apparatus 200 according to the third embodiment.

In the third embodiment, the sound collection apparatus 200 includes a plurality of detection marks 301, 302, and 303 for sound collecting direction detection. The detection marks 301, 302, and 303 are provided on the surface of the housing of the sound collection apparatus 200 and each have a size, shape, and color that can be identified by the image data captured by the image capture apparatus 100. The detection marks 301 to 303 differ in at least one of size, shape, and color. The sizes, shapes, and colors of the detection marks are not limited to those exemplarily shown in FIGS. 8A and 8B. The number of detection marks provided for the sound collection apparatus 200 is not limited to three and may be two or less or four or more.

Figure 9A:
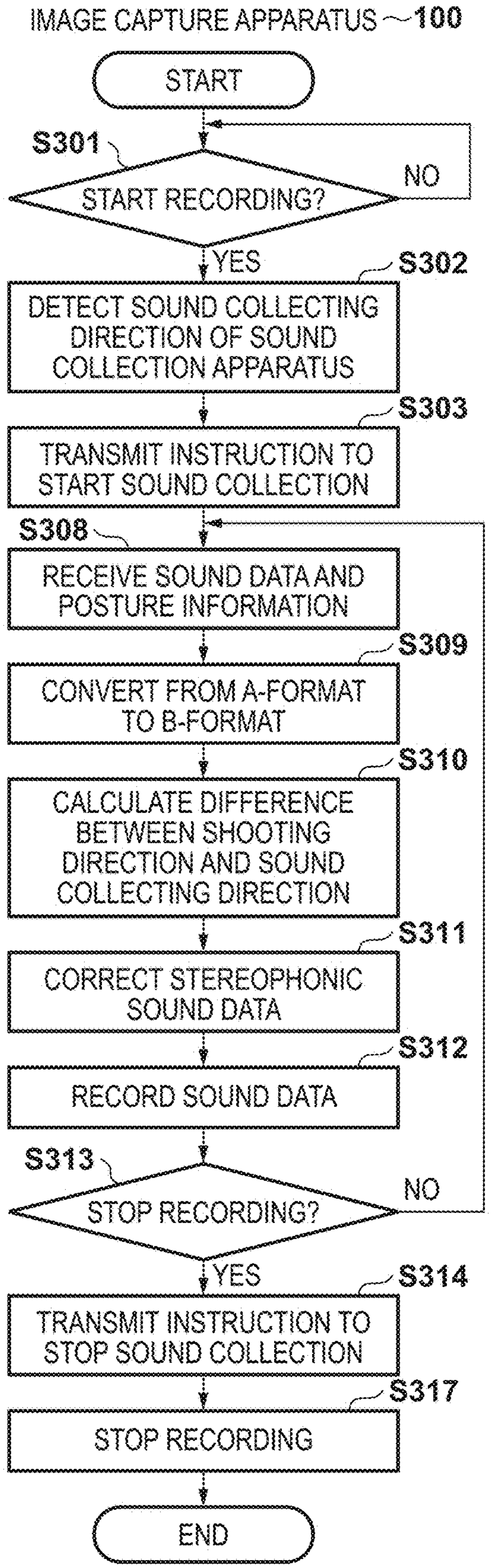
FIGS. 9A and 9B are flowcharts exemplarily showing control processing according to the third embodiment.
Figure 9B:
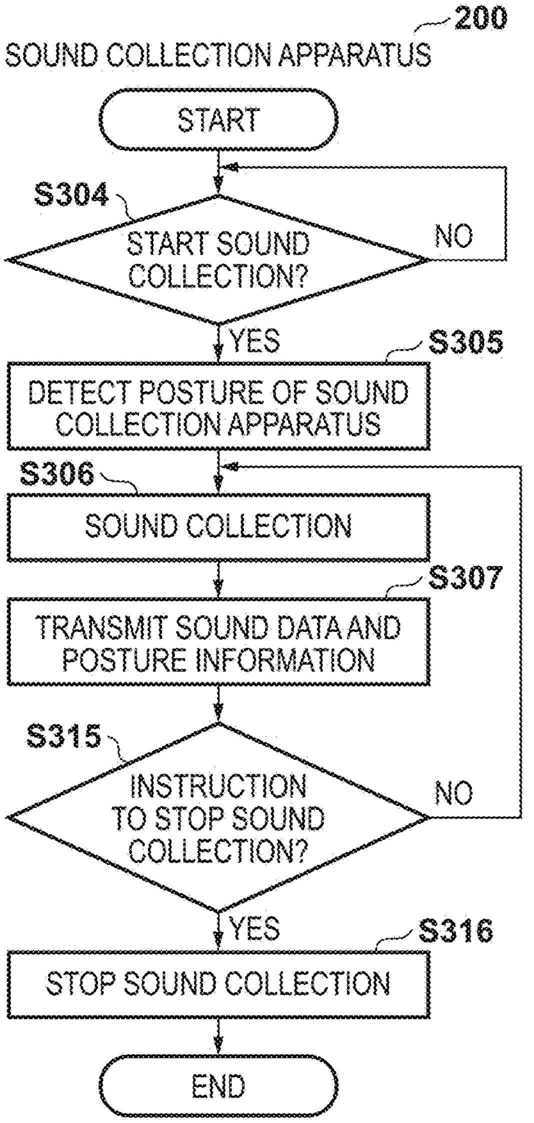

FIG. 9A is a flowchart exemplarily showing control processing by the image capture apparatus 100 according to the third embodiment. FIG. 9B is a flowchart exemplarily showing control processing by the sound collection apparatus 200 according to the third embodiment.

Step S301 is the same processing as that in step S101 in FIG. 5A.

In step S302, a first control unit 110 starts detecting the sound collecting direction of the sound collection apparatus 200 based on the image captured by an imaging unit 101. The detection marks 301, 302, and 303 are used for the detection of a sound collecting direction. The image capture apparatus 100 identifies the detection marks 301, 302, and 303 from the image data obtained by capturing an image of the sound collection apparatus 200 and detects the sound collecting direction of the sound collection apparatus 200 based on the positions of the detection marks 301, 302, and 303. The sound collecting direction corresponding to the positions of the detection marks of the sound collection apparatus 200 may be stored in the nonvolatile memory of the first control unit 110 in advance or may be obtained from the sound collection apparatus 200 via the first communication unit 112. The detection of a sound collecting direction is implemented by a known object detection method such as R-CNN, YOLO, or SSD.

Steps S303 and S304 are the same processing as that in steps S103 and S104 in FIG. 5A.

In step S305, a second control unit 203 causes a second posture detection unit 205 to start detecting the posture of the sound collection apparatus 200. The posture of the sound collection apparatus 200 is detected by, for example, a 3-axis acceleration sensor or a 3-axis gyro sensor.

Step S306 is the same processing as that in step S106 in FIG. 5A.

In step S307, the second control unit 203 causes a second communication unit 204 to transmit, to the image capture apparatus 100, the posture information of the sound collection apparatus 200 obtained in step S305 and the A-format sound data obtained by step S306. The posture information of the sound collection apparatus 200 includes time information synchronized with a time at which the sound has collected and information of the displacement amount of the posture of the sound collection apparatus 200 in the time at which the sound has collected.

Steps S308 and S309 are the same processing as that in steps S108 and S109 in FIG. 5A.

In step S310, the first control unit 110 calculates a difference ϕ between the shooting direction of the image capture apparatus 100 and the sound collecting direction of the sound collection apparatus 200 based on the sound collecting direction of the sound collection apparatus 200 detected in step S302 and the posture information of the sound collection apparatus 200 received in step S308. Assume that the shooting direction of the image capture apparatus 100 is the front direction of the lens unit 300 attached to the image capture apparatus 100. Letting ϕ0 be the sound collecting direction of the sound collection apparatus 200 detected in step S302 and Δϕ be the posture information of the sound collection apparatus 200 received in step S308, that is, the displacement amount of the posture of the sound collection apparatus 200, the difference ϕ between the shooting direction and the sound collecting direction is calculated according to equation (6).

$$\phi = \phi 0 + \Delta\phi \tag{6}$$

In step S311, the first control unit 110 causes a sound correction unit 1032 of a first sound processing unit 103 to correct the B-format sound data converted in step S309 based on the difference ϕ between the shooting direction and the sound collecting direction which is calculated in step S310. The correction method is the same as that described with reference to step S111 in FIG. 5A.

Steps S312 to S317 are the same processing as that in steps S112 to S117 in FIG. 5A. In addition, the processing in steps S301 to S312 is executed before the start of recording.

According to the third embodiment described above, the image capture apparatus 100 identifies the detection mark 301, the detection mark 302, and the detection mark 303 from the image data obtained by capturing an image of the sound collection apparatus 200. The image capture apparatus 100 then detects the sound collecting direction of the sound collection apparatus 200 based on the positions of the detection marks 301 to 303 of the sound collection apparatus 200 and calculates the difference between the shooting direction of the image capture apparatus 100 and the sound collecting direction of the sound collection apparatus 200. In a case where the shooting direction of the image capture apparatus 100 does not coincide with the sound collecting direction of the sound collection apparatus 200, the sound data obtained by the sound collection apparatus 200 is corrected based on the difference between the shooting direction and the sound collecting direction so as to match the shooting direction with the sound collecting direction. Note that although the sound data is preferably corrected so as to match the shooting direction with the sound collecting direction, limitation is not made thereto. The correction may be performed so as to reduce the difference between the shooting direction and the sound collecting direction to a predetermined threshold or less and bring the shooting direction close to the sound collecting direction. This makes it possible to correct the mismatch between the shooting direction and the sound collecting direction and match the sound direction with the moving image, thereby reducing the feeling of strangeness of the user caused by the mismatch between the moving image and the sound at the time of reproducing the moving image. Note that in the third embodiment, the sound collecting direction of the sound collection apparatus 200 is detected from the image obtained by capturing an image of the sound collection apparatus 200 at the start of recording, and a change in the sound collecting direction of the sound collection apparatus 200 is detected based on the displacement amount of the posture of the sound collection apparatus 200 during the recording. However, limitation is not made thereto. For example, a change in the sound collecting direction of the sound collection apparatus 200 during recording may be calculated from the image obtained by capturing an image of the sound collection apparatus 200. In the processing of capturing an image of the sound collection apparatus 200, whether to or not to execute image capturing processing may be switched in accordance with whether the sound collection apparatus 200 falls within the image capturing range (the angle of view) of the image capture apparatus 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-195292, filed Nov. 16, 2023 which is hereby incorporated by reference herein in its entirety.

What is claimed is:

1. An image capture apparatus comprising:
at least one processor which functions as:
a connection unit that connects to a sound collection apparatus configured to collect sound data in different directions;
a sound processing unit that generates stereophonic data based on sound data obtained from the sound collection apparatus; and
a correction unit that corrects the stereophonic data based on a difference between a shooting direction of the image capture apparatus and a sound collecting direction of the sound collection apparatus.

2. The apparatus according to claim 1, wherein the at least one processor further functions as:
a detection unit that detects a posture of the image capture apparatus and outputs posture information of the image capture apparatus relating to the posture of the image capture apparatus; and
a communication unit that obtains the sound data from the sound collection apparatus and posture information of the sound collection apparatus relating to a posture of the sound collection apparatus,
wherein the correction unit performs the correction based on the posture information of the image capture apparatus and the posture information of the sound collection apparatus.

3. The apparatus according to claim 2, wherein the shooting direction of the image capture apparatus is obtained from the posture information of the image capture apparatus, and the sound collecting direction of the sound collection apparatus is obtained from the posture information of the sound collection apparatus.

4. The apparatus according to claim 1, wherein the at least one processor further functions as:
a detection unit that detects a direction of the sound collection apparatus with respect to the image capture apparatus;
wherein the connection unit obtains the sound data from the sound collection apparatus and information concerning a direction of the image capture apparatus with respect to the sound collection apparatus,
wherein the correction unit performs the correction based on information concerning a direction of the sound collection apparatus with respect to the image capture apparatus and a direction of the image capture apparatus with respect to the sound collection apparatus.

5. The apparatus according to claim 4, wherein the difference between the shooting direction of the image capture apparatus and the sound collecting direction of the sound collection apparatus is obtained from the direction of the sound collection apparatus with respect to the image capture apparatus and the direction of the image capture apparatus with respect to the sound collection apparatus.

6. The apparatus according to claim 1, wherein the at least one processor further functions as:
a detection unit that detects the sound collecting direction of the sound collection apparatus from an image obtained by capturing an image of the sound collection apparatus.

7. The apparatus according to claim 6, wherein the detection unit identifies a plurality of detection marks provided for the sound collection apparatus from image data obtained by capturing an image of the sound collection apparatus and detects the sound collecting direction of the sound collection apparatus based on positions of the plurality of detection marks.

8. The apparatus according to claim 7, wherein the plurality of detection marks differ in at least one of size, shape, and color.

9. The apparatus according to claim 7, wherein
the connection unit obtains the sound data from the sound collection apparatus and posture information of the sound collection apparatus,
wherein the detection unit obtains the difference between the shooting direction of the image capture apparatus and the sound collecting direction of the sound collection apparatus based on the sound collecting direction of the sound collection apparatus and the posture information of the sound collection apparatus.

10. The apparatus according to claim 1, wherein the correction unit corrects the stereophonic data so as to match the shooting direction of the image capture apparatus with the sound collecting direction of the sound collection apparatus.

11. The apparatus according to claim 1, wherein the correction unit corrects the stereophonic data so as to reduce the difference between the shooting direction of the image capture apparatus and the sound collecting direction of the sound collection apparatus to not more than a predetermined threshold.

12. The apparatus according to claim 1, wherein sound data obtained by the sound collection apparatus is Ambisonics A-format sound data,
the sound processing unit converts the A-format sound data into B-format sound data, and
the correction unit corrects the B-format sound data.

13. The apparatus according to claim 1, further comprising:
an imaging circuit; and
wherein the at least one processor further functions as a generating unit that generates a moving image file by combining image data captured by the imaging circuit and sound data generated by the sound processing unit.

14. The apparatus according to claim 1, wherein the connection unit is connected to the sound collection apparatus by wireless communication.

15. A method of controlling an image capture apparatus, comprising:
connecting to a sound collection apparatus configured to collect sound data in different directions;
generating stereophonic data based on the sound data obtained from the sound collection apparatus; and
correcting the stereophonic data based on a difference between a shooting direction of the image capture apparatus and a sound collecting direction of the sound collection apparatus.

16. A non-transitory computer-readable storage medium storing a program for causing a computer to function as an image capture apparatus comprising:
at least one processor which functions as:
a connection unit that connects to a sound collection apparatus configured to collect sound data in different directions;
a sound processing unit that generates stereophonic data based on sound data obtained from the sound collection apparatus; and
a correction unit that corrects the stereophonic data based on a difference between a shooting direction of the image capture apparatus and a sound collecting direction of the sound collection apparatus.

* * * * *